(12) United States Patent
Oda

(10) Patent No.: US 6,987,507 B2
(45) Date of Patent: Jan. 17, 2006

(54) CURRENT FEED CIRCUIT FOR SENSOR COILS IN COORDINATE INPUT DEVICE

(75) Inventor: Yasuo Oda, Saitama (JP)

(73) Assignee: Wacom Co., Ltd., Saitama-ken (JP)

( * ) Notice: Subject to any disclaimer, the term of this patent is extended or adjusted under 35 U.S.C. 154(b) by 353 days.

(21) Appl. No.: 10/338,696

(22) Filed: Jan. 9, 2003

(65) Prior Publication Data

US 2003/0169082 A1    Sep. 11, 2003

(30) Foreign Application Priority Data

Jan. 9, 2002    (JP)    .............................. 2002-001952

(51) Int. Cl.
*G09G 5/00*    (2006.01)
(52) U.S. Cl. ..................... 345/179; 345/174; 178/18.07
(58) Field of Classification Search .. 178/18.01–18.11, 178/19.01–19.07; 345/173–179
See application file for complete search history.

(56) References Cited

U.S. PATENT DOCUMENTS

| 4,728,944 A | * | 3/1988 | Tamaru et al. ............... 345/174 |
| 5,796,389 A | * | 8/1998 | Bertram et al. ............. 345/173 |

* cited by examiner

*Primary Examiner*—Dennis-Doon Chow
(74) *Attorney, Agent, or Firm*—Berenato, White & Stavish, LLC

(57) ABSTRACT

A current feed circuit for feeding a high-frequency current to a plurality of sensor coils in a coordinate input device includes a high-frequency signal transmitting circuit for generating a high-frequency current corresponding to a high-frequency signal input; a plurality of driver transistors, each being provided between the high-frequency signal transmitting circuit and each of a plurality of sensor coils for transmitting the high-frequency current to the corresponding sensor coil; and a plurality of switches, each being provided with respect to each of the plurality of driver transistors for turning on/off the corresponding driver transistor.

24 Claims, 4 Drawing Sheets

PRIOR ART

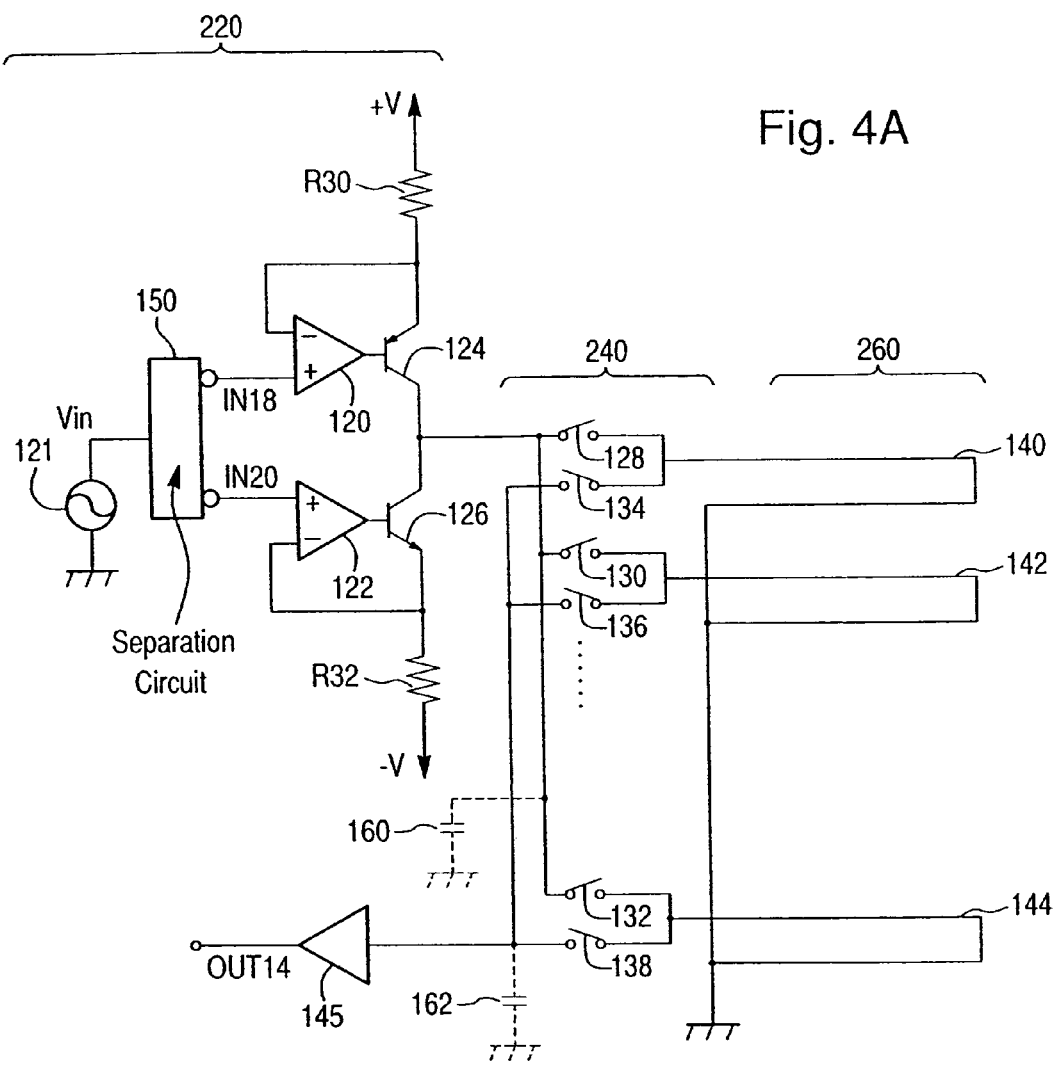
Fig. 4A
PRIOR ART
Fig. 4B
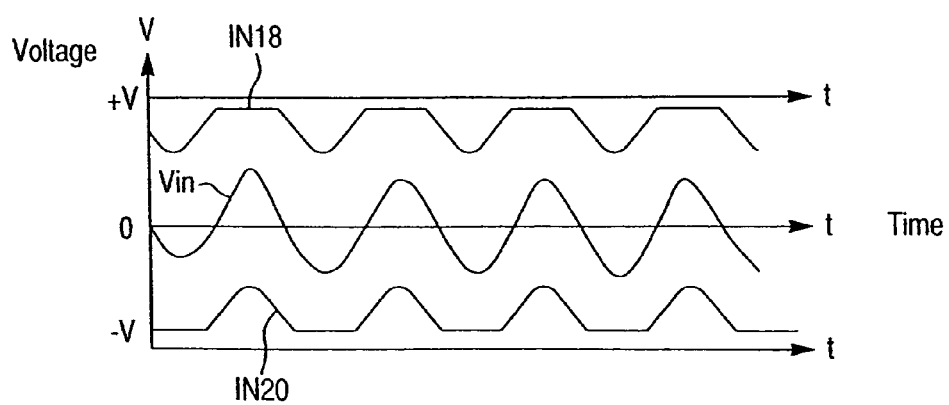
PRIOR ART

CURRENT FEED CIRCUIT FOR SENSOR COILS IN COORDINATE INPUT DEVICE

CLAIM TO PRIORITY

Applicant hereby claims priority under 35 U.S.C. § 119 to Japanese Application No. 2002-001952, filed Jan. 9, 2002, titled Current Feed Circuit for Sensor Coils in Coordinate Input Device, the disclosure of which is incorporated herein by reference.

FIELD OF THE INVENTION

The present invention relates to a current feed circuit for sensor coils in an electromagnetic inductive coordinate input device.

BACKGROUND OF THE INVENTION

The configuration of a conventional coordinate input device having a cordless position pointing device 200 is best shown in FIG. 3. Such a coordinate input device employs an electromagnetic transfer method, and has a plurality of sensor coils provided side by side in the direction of the X axis, as well as in the direction of the Y axis, of a coordinate input surface. An alternating magnetic field is transmitted from the sensor coils by feeding current to the sensor coils in a sending mode. When the transmitted alternating magnetic field excites a coil or a resonant circuit in the position pointing device 200, the position pointing device 200 transmits a response to the alternating magnetic field. When the sensor coils stop sending the alternating magnetic field, they are in a receiving mode, and receive a response to the alternating magnetic field. A coordinate of the position pointing device 200 is then calculated by analyzing signal strength distribution of received signals in each of the sensor coils.

High-frequency signals generated by a high-frequency signal generator 121 are transmitted to the sensor coils in the sending mode. The coordinate input device has coil switching means for selecting each of the sensor coils in order to transmit the high-frequency signals, or to receive receiver signals, and has transmission/reception switching means for switching between the sending mode and the receiving mode in each of the sensor coils. The coil switching means may be separately provided from the transmission/reception switching means, or it may serve as the transmission/reception switching means. Generally, switching means such as an analog switch is used. The receiver signals are passed to a signal analysis section through a receiving circuit 145. The electromagnetic transfer method is described in detail in Japanese Examined Patent Application Publication No. 2-53805, Japanese Unexamined Patent Application Publication No. 8-286814, and Japanese Unexamined Patent Application Publication No. 8-249105.

A sensor coil group and the receiving circuit of FIG. 3 is best shown in FIG. 4A. A transmitting circuit 220 includes the high-frequency signal generator 121, a coil switching section 240, a sensor coil group 260, and the receiving circuit 145. In the transmitting circuit 220, a separation circuit 150 receives a signal Vin generated by the high-frequency signal generator 121. The separation circuit 150 separates the signal Vin into a half-wave signal to which positive bias voltage is applied (the top waveform in FIG. 4B) and a half-wave signal to which negative bias voltage is applied (the bottom waveform in FIG. 4B). The negative signal is input to a positive input terminal IN18 of an operational amplifier 120 (hereinafter referred to as an op-amp), and the positive signal is input to a positive input terminal IN20 of an op-amp 122. The op-amps 120 and 122 control the voltage corresponding to signal voltages input to the input terminals IN18 and IN20, respectively, such that the voltage is applied to the lower end of a resistor R30 and the upper end of a resistor R32, respectively. A current having a potential difference divided by the corresponding resistance of the resistor R30 or R32 flows through the resistor R30 or R32. Each of the op-amps 120 and 122 generates a high-frequency current corresponding to input high-frequency signals. The generated high-frequency current is combined into a full-wave signal through a driver transistor 124 or 126 that is transmitted to the coil switching section 240.

The coil switching section 240 includes pairs of sending analog switches 128, 130 . . . 132 and corresponding receiving analog switches 134, 136 . . . 138. The pairs are connected to the sensor coils 140, 142 . . . 144 included in the sensor coil group 260, respectively. To select one of the sensor coils 140, 142 . . . 144 for the sending mode, the sending analog switch connected to the selected sensor coil is turned on and the remaining analog switches are turned off. To select one of the sensor coils 140, 142 . . . 144 for the receiving mode, the receiving analog switch connected to the selected sensor coil is turned on and the remaining analog switches are turned off. Sequentially turning on/off these analog switches makes it possible to sequentially transmit the high-frequency signals to the sensor coils 140, 142 . . . 144, and to sequentially obtain received signals as the response to the alternating magnetic field. The received signals as the response to the alternating magnetic field are voltage signals based on induced voltage generated in the sensor coils 140, 142 . . . 144 owing to an electromagnetic interaction with the response to the alternating magnetic field. The received signals from the sensor coils 140, 142 . . . 144 are output to an output terminal OUT14 through the receiving circuit 145. The output signals are passed to the signal analysis section where coordinate calculation is performed.

In the conventional coordinate input device described above, a pair of a transmitting analog switches and a receiving analog switch are connected to each of the sensor coils 140, 142 . . . 144, and the high-frequency signals are transmitted with these analog switches. Accordingly, power loss results due to voltage loss by on-resistance of the analog switches. Thus, the transmitted current undesirably decreases. Under low power supply voltage, insufficient transmitted current may result in serious problems.

In addition, in the conventional coordinate input device described above, stray capacitance 160 and 162 may increase due to connection of a plurality of sending analog switches and a plurality of receiving analog switches. The stray capacitance 160 of the sending analog switches decreases output impedance when transmitting the high-frequency signals, thereby causing poor constant-current characteristics. Furthermore, resonance between the stray capacitance in the sending analog switches and the sensor coils is triggered, which decreases resonant frequency. Therefore, it becomes difficult to maintain the stability in the high-frequency signal generator in the transmitting circuit.

SUMMARY OF THE INVENTION

Accordingly, it is an object of the present invention to solve various problems caused by a plurality of analog switches, particularly a plurality of sending analog switches, connected to sensor coils. One object of the present invention is to configure a current feed circuit without voltage loss owing to on-resistance of sending analog switches in order to achieve sufficient transmitted current. Another object of the present invention is to suppress the decrease in output impedance when transmitting high-frequency signals by eliminating effects of stray capacitance of the sending analog switches, and to ensure the stability of a high-frequency signal generator in a transmitting circuit by suppressing an undesirable decrease in resonant frequency between the sending analog switches and the sensor coils.

The present invention provides a current feed circuit for a plurality of sensor coils in a coordinate input device. The circuit includes a first high-frequency signal transmitting circuit for generating a first high-frequency current corresponding to a positive half-wave high-frequency signal input; a second high-frequency signal transmitting circuit for generating a second high-frequency current corresponding to a negative half-wave high-frequency signal input; a first plurality of driver transistors, each being provided between the first high-frequency signal transmitting circuit, and each of the plurality of sensor coils for transmitting the first high-frequency current to the corresponding sensor coil; a second plurality of driver transistors, each being provided between the second high-frequency signal transmitting circuit and each of the plurality of sensor coils for transmitting the second high-frequency current to the corresponding sensor coil; a first plurality of switches, each being provided with respect to each of the first plurality of driver transistors for turning on/off the corresponding driver transistor; a second plurality of switches, each being provided with respect to each of the second plurality of driver transistors for turning on/off the corresponding driver transistor; and a circuit element for combining the first high-frequency current transmitted from the first plurality of driver transistors with the second high-frequency current transmitted from the second plurality of driver transistors to transmit the combined current to each of the plurality of sensor coils.

In the current feed circuit for sensor coils in a coordinate input device, each of the first plurality of driver transistors is preferably cascade-connected to the output from the first high-frequency signal transmitting circuit. Each of the second plurality of driver transistors is preferably cascade-connected to the output of the second high-frequency signal transmitting circuit.

Providing each of the driver transistors corresponding to each of the plurality of sensor coils with a driving switch allows each of the driver transistors to feed current and select the sensor coils. This eliminates sending analog switches, thereby eliminating voltage loss (on-resistance loss) and stray capacitance owing to the sending analog switches. Accordingly, the high-frequency current is sufficiently and stably transmitted.

A second aspect of the present invention provides a current feed circuit for a plurality of sensor coils in a coordinate input device. The circuit includes a high-frequency signal transmitting circuit for generating a high-frequency current corresponding to a high-frequency signal input; a plurality of driver transistors, each being provided between the high-frequency signal transmitting circuit, and each of the plurality of sensor coils for transmitting the high-frequency current to the corresponding sensor coil; and a plurality of switches, each being provided with respect to each of the plurality of driver transistors for turning on/off the corresponding driver transistor.

In the current feed circuit for sensor coils in a coordinate input device according to the second aspect of the present invention, each of the plurality of driver transistors is preferably cascade-connected to the output of the high-frequency signal transmitting circuit.

Cascade-connecting the plurality of driver transistors to the output of the high-frequency signal transmitting circuit can avoid the state in which the high-frequency signal transmitting circuit directly drives the sensor coils serving as the load thereof, thereby stabilizing the output voltage at a certain level. The affect on the cascade-connected driver transistors by impedance change of the sensor coils is deminimus. Even when the driver transistors have stray capacitance, it hardly affects the sensor coils. Accordingly, the output from the high-frequency signal transmitting circuit is stabilized at a certain level.

BRIEF DESCRIPTION OF THE FIGURES

FIG. 4A is a circuit diagram of a current feed circuit for sensor coils in the conventional coordinate input device of FIG. 3; and FIG. 4B is a graph showing a signal Vin and half-wave signals separated by a separation circuit.

DETAILED DESCRIPTION OF THE INVENTION

Figure 1:
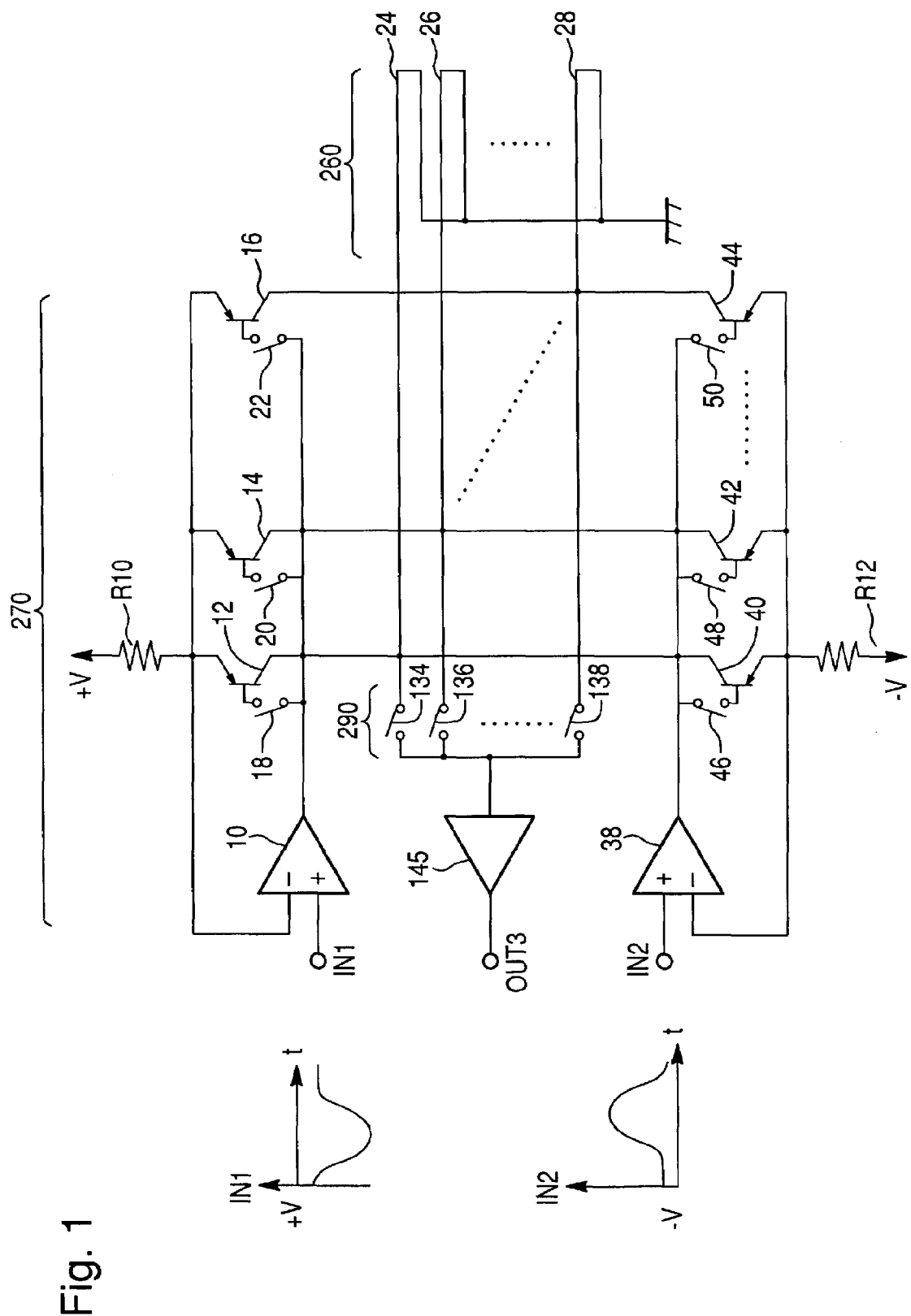
FIG. 1 is a circuit diagram of a current feed circuit for sensor coils in a coordinate input device according to a first embodiment of the present invention.

A circuit diagram according to a first embodiment of the present invention is best shown in FIG. 1. A transmitting circuit 270 includes a current feed circuit for feeding current to sensor coils in a coordinate input device. A sensor coil group 260 includes a plurality of sensor coils 24, 26 . . . 28 connected to the transmitting circuit 270. The transmitting circuit 270 also includes a high-frequency signal generator and a separation circuit in a transmitting circuit (the high-frequency signal generator, the separation circuit, and the transmitting circuit are the same as the high-frequency signal generator 121, the separation circuit 150, and the transmitting circuit 220 in FIG. 4)(not shown). FIG. 1 shows only downstream components from an op-amp 10 to which negative half-wave signals are supplied and an op-amp 38 to which positive half-wave signals are supplied.

As best shown in FIG. 1, the transmitting circuit 270 includes the current feed circuit for sensor coils functions as sending analog switches (referred to as numerals 128, 130 . . . 132 in FIG. 4) in a coil switching section in the transmitting circuit (referred to as numerals 240 and 220 in FIG. 4). Accordingly, the transmitting circuit 270 does not have sending analog switches directly connected to each of the sensor coils. Only receiving analog switches 134, 136 . . . 138 in a receiving coil switching section 290 are connected to the sensor coils 24, 26 . . . 28, respectively. The receiving coil switching section 290 and the receiving circuit 145 connected thereto are the same as those in conventional coordinate input devices. Received signals from an output terminal OUT3 are passed to a signal analysis section for coordinate calculation.

The op-amps 10 and 38 control the voltage corresponding to signal voltages input to input terminals IN1 and IN2, respectively, so that the voltage is applied to the lower end of a resistor R10 and the upper end of a resistor R12, respectively. A current having a potential difference divided by the corresponding resistance of the resistor R10 or R12 flows through the resistor R10 or R12. Each of the op-amps 10 and 38 generates high-frequency current corresponding to input high-frequency signals. The generated high-frequency current is transmitted to the sensor coils 24, 26 . . . 28 through driver transistors.

In the current feed circuit for sensor coils of the present invention, a driver transistor for feeding the high-frequency current is arranged between the op-amp 10 and each of the sensor coils 24, 26 . . . 28. A driver transistor for feeding the high-frequency current is arranged between the op-amp 38 and each of the sensor coils 24, 26 . . . 28. Driver transistors connected to the op-amp 10 are connected in parallel with each other, and driver transistors connected to the op-amp 38 are connected in parallel with each other. Turning on/off each of the driver transistors may switch each of the sensor coils 24, 26 . . . 28 from a selected mode to an unselected mode, and vice versa.

A plurality of the driver transistors 12, 14 . . . 16 for negative half-wave signals, and a plurality of the driver transistors 40, 42 . . . 44 for positive half-wave signals, shown in FIG. 1, function both as the driver transistor for feeding current and for switching the sensor coils.

The driver transistors 12, 14 . . . 16 are turned on/off by switches 18, 20 . . . 22, respectively, and the driver transistors 40, 42 . . . 44 are turned on/off by switches 46, 48 . . . 50, respectively, each switch being connected to the base of the respective driver transistors. A bias current is fed to a driver transistor having the corresponding switch turned on. The driver transistor to which the bias current is fed switches on.

Since the positive half-wave signals and the negative half-wave signals are combined into full-wave signals that are transmitted to the sensor coils 24, 26 . . . 28, for example, the driver transistors 12 and 40 may constitute a pair of driver transistors (driver transistors 124 and 126 in FIG. 4) interlocking with each other to switch on/off. When both the driver transistors switch on, the high-frequency signals are transmitted to the sensor coil 24. Similarly, the driver transistors 14 and 42 constitute a pair of driver transistors interlocking with each other to switch on/off, and the driver transistors 16 and 44 constitute a pair of driver transistors interlocking with each other to switch on/off.

The circuit configuration shown in FIG. 1 allows for the selection of each of the sensor coils 24, 26 . . . 28 in a sending mode without providing a plurality of sending analog switches connected to the respective sensor coils. Accordingly, since it is possible to directly transmit the high-frequency current to the sensor coils, the power loss due to on-resistance of the sending analog switches is suppressed, thereby generating sufficient current. This circuit configuration therefore eliminates stray capacitance due to the sending analog switches, and excludes adverse effects of the stray capacitance to the high-frequency signals.

Other equivalent high-frequency signal transmitting circuits may be arranged according to known circuit techniques, instead of employing the op-amp 10 as the high-frequency signal transmitting circuit for negative half-waves, and the op-amp 38 as the high-frequency signal transmitting circuit for positive half-waves.

Also, the positive and negative high-frequency signals with a reference voltage of 0V (common voltage) are generated using two power supplies, that is, a positive power supply (+V) and a negative power supply (−V), to be transmitted to the sensor coils 24, 26 . . . 28. However, according to another embodiment of the present invention, the positive and negative high-frequency signals with a reference voltage of ½V (common voltage) may be generated using a single power supply (+V) transmitted to the sensor coils. The term "positive" or "negative" in a "positive half-wave signal" or a "negative half-wave signal" corresponds to sink or source.

Referring to FIG. 1, the positive and negative half-wave high-frequency signals are combined into the full-wave signals that are transmitted to the sensor coils 24, 26 . . . 28. However, according to another embodiment of the present invention, it is possible to generate an alternating magnetic field and to receive a response to the alternating magnetic field by generating AC signals at DC superposition with respect to either the positive or the negative half-wave high-frequency signals and transmitting the generated AC signals to the sensor coils. In this case, either the upper half of the transmitting circuit 270 (including the op-amp 10) or the lower half thereof (including the op-amp 38) in FIG. 1 is adequate.

The driver transistors in FIG. 1 are not limited to bipolar transistors, and may be other transistors such as FETs (field effect transistors).

Figure 2:
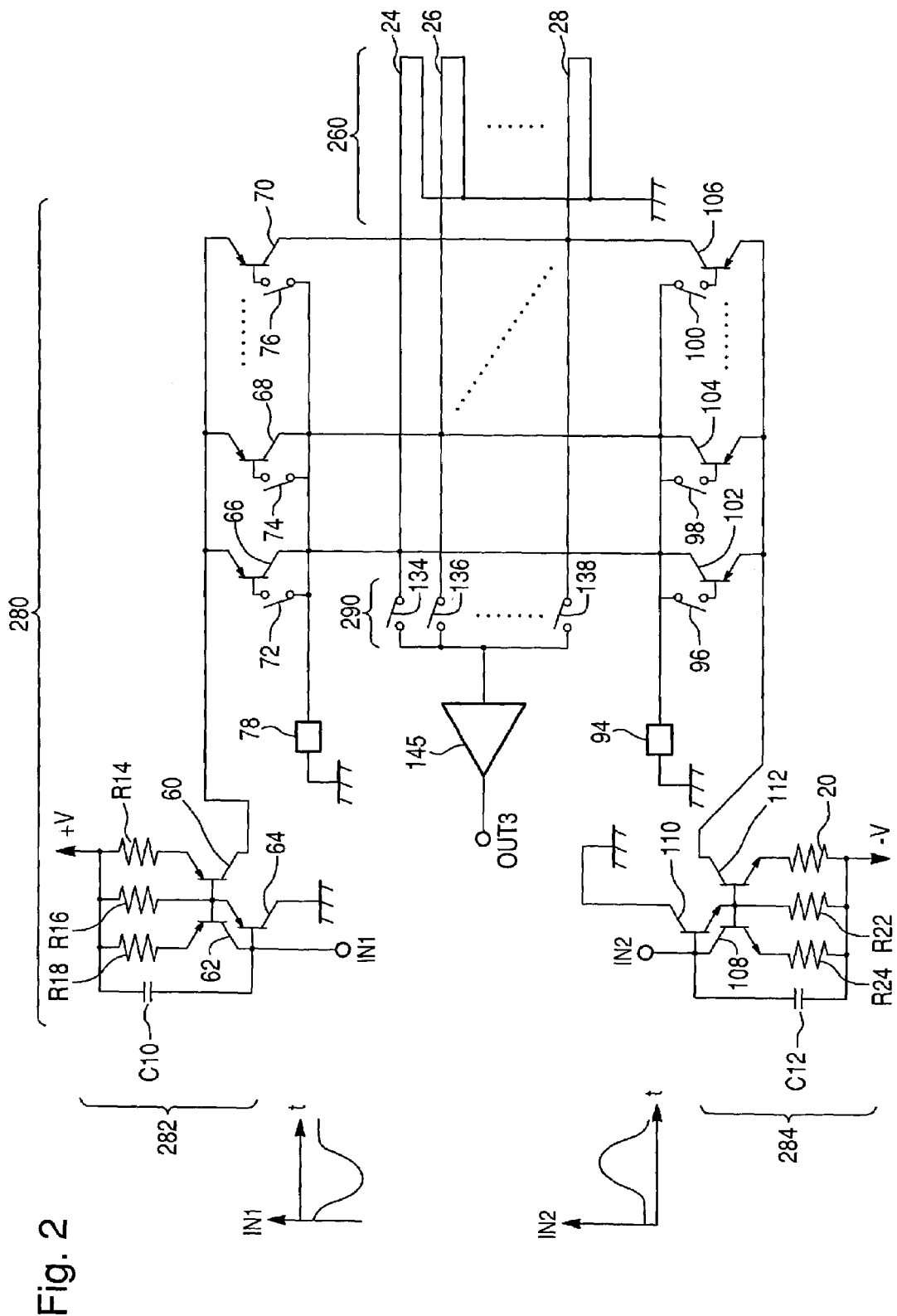
FIG. 2 is a circuit diagram of a current feed circuit for sensor coils in a coordinate input device according to a second embodiment of the present invention.
Figure 3:
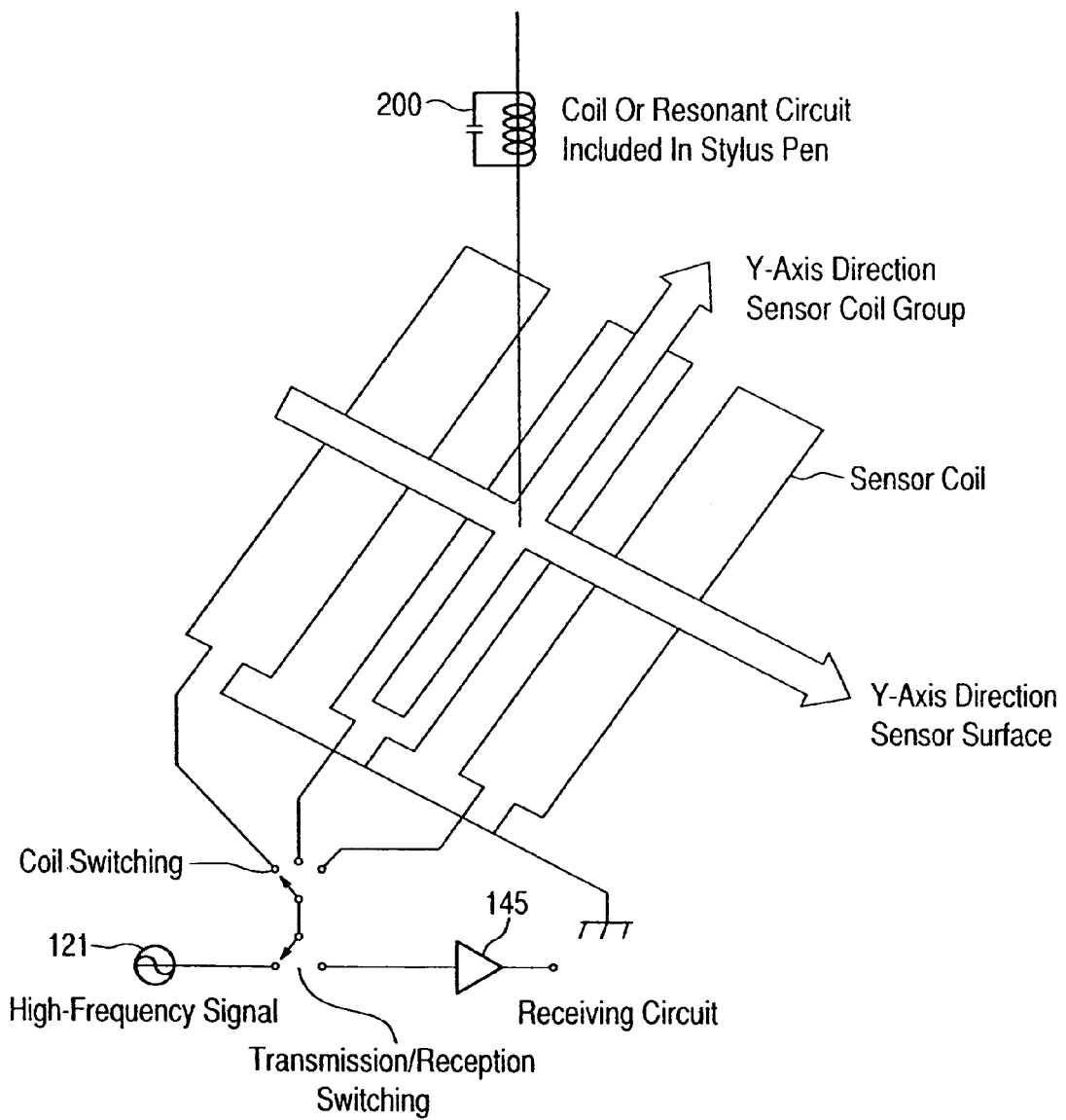
FIG. 3 is a schematic view of a conventional coordinate input device.

A circuit diagram according to a second embodiment of the present invention is best shown in FIG. 2. A transmitting circuit 280 includes a current feed circuit for sensor coils in a coordinate input device, and a sensor coil group 260 including a plurality of sensor coils 24, 26 . . . 28 connected to the transmitting circuit 280. The transmitting circuit 280 according to the second embodiment also includes a high-frequency signal generator and a separation circuit in a transmitting circuit (the high-frequency signal generator, the separation circuit, and the transmitting circuit are the same as the high-frequency signal generator 121, the separation circuit 150, and the transmitting circuit 220 in FIG. 4)(not shown). FIG. 2 shows only downstream components from an input terminal IN1 for negative half-wave signals and an input terminal IN2 for positive half-wave signals. In the exemplary circuit according to this embodiment, the half-wave signals input into the input terminals IN1 and IN2 become current signals. The same reference numerals are used to identify the same elements in the first embodiment shown in FIG. 1.

The transmitting circuit 270 according to the first embodiment uses the op-amps as the high-frequency signal transmitting circuits. By contrast, the transmitting circuit 280 according to the second embodiment uses a three-transistor current-mirror circuit including transistors 60, 62, and 64 as a high-frequency signal transmitting circuit 282 for the negative half-wave signals and uses a three-transistor current-mirror circuit including transistors 108, 110, and 112 as a high-frequency signal transmitting circuit 284 for the positive half-wave signals. The high-frequency signal transmitting circuits 282 and 284 have a function of generating high-frequency current corresponding to input high-frequency signals.

For example, the negative half-wave high-frequency signals are input to the three-transistor current-mirror circuit as bias current of the transistor 64 in the high-frequency signal transmitting circuit 282. The transistor 60 is driven by voltage corresponding to the high-frequency signals and amplifies the high-frequency signals. A current having a potential difference divided by a resistance stably flows through a resistor 14. The high-frequency current is output from the output of the transistor 60. The high-frequency signal transmitting circuit 282 amplifies the half-wave high-frequency signals to realize stable current feed. The same applies to the high-frequency signal transmitting circuit 284.

The transmitting circuit 280 is characterized in that a plurality of driver transistors 66, 68 . . . 70, which are connected in parallel with each other, are cascade-connected to the output transistor of the high-frequency signal transmitting circuit 282. Similarly, a plurality of driver transistors 102, 104 . . . 106, which are connected in parallel with each other, are cascade-connected to the output transistor of the high-frequency signal transmitting circuit 284. This connection method, which is different from that employed in the driver transistors in known coordinate input devices or that according to the first embodiment, is characteristic of the driver transistors according to the second embodiment. Specifically, the driver transistors 66, 68 . . . 70 are cascade-connected to the output transistor 60 in the high-frequency signal transmitting circuit 282, and the driver transistors 102, 104 . . . 106 are cascade-connected to the output transistor 112 in the high-frequency signal transmitting circuit 284.

In cascade connection, neither the high-frequency signal transmitting circuit 282, nor the high-frequency signal transmitting circuit 284, directly drives the sensor coils 24, 26 . . . 28. Each of the driver transistors 66, 68 . . . 70 shields the output transistor 60 in the high-frequency signal transmitting circuit 282 from voltage variation occurring in the output of each of the driver transistors in such cascade connection. Similarly, each of the driver transistors 102, 104 . . . 106 shields the output transistor 112 in the high-frequency signal transmitting circuit 284 from voltage variation occurring in the output of each of the driver transistors.

Accordingly, in the high-frequency signal transmitting circuit 282, even when each of the driver transistors 66, 68 . . . 70 has stray capacitance, the stray capacitance has little effect on the sensor coils 24, 26 . . . 28. Similarly, in the high-frequency signal transmitting circuit 284, even when each of the driver transistors 102, 104 . . . 106 has stray capacitance, the stray capacitance has little effect on the sensor coils 24, 26 . . . 28. Since each of the cascade-connected driver transistors is minimally affected by impedance change in the sensor coils, it can output a certain level of current. Furthermore, operation of the high-frequency signal transmitting circuit itself is stable.

Also according to the second embodiment, a plurality of driver transistors are connected to the sensor coils 24, 26 . . . 28, respectively. Turning on/off each of the driver transistors can switch each of the sensor coils 24, 26 . . . 28 from a selected mode to an unselected mode, and vice versa. In other words, the driver transistors 66, 68 . . . 70 for negative half-wave signals, and the driver transistors 102, 104 . . . 106 for positive half-wave signals in FIG. 2, function both as the driver transistor for feeding current and for switching the sensor coils, as in the first embodiment in FIG. 1.

The driver transistors 66, 68 . . . 70 are turned on/off by switches 72, 74 . . . 76, respectively, and the driver transistors 102, 104 . . . 106 are turned on/off by switches 96, 98 . . . 100, respectively. Each switch is connected to the base of the respective driver transistors. A bias current is fed only to a driver transistor having the corresponding switch turned on, and the driver transistor to which the bias current is fed switches on. Power supplies 78 and 94 supply the bias current. The driver transistors 66 and 102 are interlocked with each other to switch on/off. The driver transistors 68 and 104 are interlocked with each other to switch on/off such that the positive half-wave signals and the negative half-wave signals are combined into full-wave signals that are transmitted to the sensor coils, as in the first embodiment. In other words, each of the driver transistors functions both for feeding current and for selecting the sensor coils by providing each of the driver transistors corresponding to each of the sensor coils 24, 26 . . . 28 with a driving switch. Conventional sending analog switches are unnecessary in such a configuration, thereby eliminating the stray capacitance caused by the sending analog switches. Accordingly, the high-frequency current is sufficiently transmitted, and is stable.

As described above, omission of the sending analog switches helps to eliminate the stray capacitance. Since the high-frequency signal transmitting circuits 282 and 284 do not directly drive the sensor coils 24, 26 . . . 28 serving as the load thereof, the output voltage is stabilized at a certain level. The driver transistors cascade-connected to outputs of the high-frequency signal transmitting circuits 282 and 284 are hardly affected by the impedance change in the sensor coils 24, 26 . . . 28. Even when the driver transistors have the stray capacitance, it hardly affects the sensor coils 24, 26 . . . 28.

Other equivalent high-frequency signal transmitting circuits may be arranged using known circuit techniques, instead of using the three-transistor current-mirror circuit as the negative or positive high-frequency signal transmitting circuit 282 or 284.

Also, the positive and negative high-frequency signals with a reference voltage of 0V (common voltage) are generated using two power supplies, that is, the positive power supply (+V) 78 and the negative supply (−V) 94, to be transmitted to the sensor coils 24, 26 . . . 28. However, according to another embodiment of the present invention, the positive and negative high-frequency signals with a reference voltage of ½V (common voltage) may be generated using a single power supply (+V) transmitted to the sensor coils.

Referring to FIG. 2, the positive and negative half-wave high-frequency signals are combined into the full-wave signals that are transmitted to the sensor coils 24, 26 . . . 28. However, according to another embodiment of the present invention, it is possible to generate an alternating magnetic field, and to receive a response to the alternating magnetic field by generating AC signals at DC superposition with respect to either the positive or the negative half-wave high-frequency signals and transmitting the generated AC signals to the sensor coils. In this case, either the upper half of the transmitting circuit 280 (including the high-frequency signal transmitting circuit 282) or the lower half thereof (including the high-frequency signal transmitting circuit 284) in FIG. 2 is adequate.

The driver transistors in FIG. 2 are not limited to bipolar transistors and may be other transistors such as FETs.

It will be apparent to one of ordinary skill in the art that various modifications and variations can be made in construction and configuration of the present invention without departing from the scope or spirit of the invention. Therefore, it is intended that the present invention cover such modifications and variations of the invention, provided they come within the scope of the following claims and their equivalents.

What is claimed is:

1. A current feed circuit for feeding a high frequency current to a plurality of sensor coils included in an electromagnetic inductive coordinate input device, the circuit comprising:

a first high-frequency signal transmitting circuit for generating a first high-frequency current corresponding to a positive half-wave high-frequency signal input;

a second high-frequency signal transmitting circuit for generating a second high-frequency current corresponding to a negative half-wave high-frequency signal input;

a first plurality of driver transistors, each being provided between said first high-frequency signal transmitting circuit and each of a plurality of sensor coils for transmitting the first high-frequency current to the corresponding sensor coil;

a second plurality of driver transistors, each being provided between the second high-frequency signal transmitting circuit and each of a plurality of sensor coils for transmitting the second high-frequency current to the corresponding sensor coil;

a first plurality of switches, each being provided with respect to each of said first plurality of driver transistors for turning on/off the corresponding driver transistor;

a second plurality of switches, each being provided with respect to each of said second plurality of driver transistors for turning on/off the corresponding driver transistor; and a circuit element for combining the first high-frequency current transmitted from said first plurality of driver transistors with the second high-frequency current transmitted from said second plurality of driver transistors to transmit the combined current to each of the plurality of sensor coils.

2. The current feed circuit of claim 1, wherein said first high-frequency signal transmitting circuit comprises a high-frequency signal generator and a separation circuit.

3. The current feed circuit of claim 1, wherein said first high-frequency signal transmitting circuit is an operational amplifier.

4. The current feed circuit of claim 1, wherein said second high-frequency signal transmitting circuit comprises a high-frequency signal generator and a separation circuit.

5. The current feed circuit of claim 1, wherein said second high-frequency signal transmitting circuit includes an operational amplifier.

6. The current feed circuit for sensor coils in a coordinate input device of claim 1, wherein each of said first plurality of driver transistors is cascade-connected to an output from said first high-frequency signal transmitting circuit, and each of said second plurality of driver transistors is cascade-connected to an output of said second high-frequency signal transmitting circuit.

7. The current feed circuit of claim 1, wherein said first plurality of driver transistors are connected in parallel with each other.

8. The current feed circuit of claim 1, wherein said second plurality of driver transistors are connected in parallel with each other.

9. The current feed circuit of claim 1, wherein said first and second high-frequency currents are generated using two power supplies.

10. The current feed circuit of claim 1, wherein said first and second high-frequency currents are generated using one power supply.

11. The current feed circuit of claim 1, wherein said first and second pluralities of driver transistors are selected from the group consisting of bipolar transistors and field effect transistors.

12. A current feed circuit for feeding a high-frequency current to a plurality of sensor coils included in an electromagnetic inductive coordinate input device, the circuit comprising:

a high-frequency signal transmitting circuit for generating a high-frequency current corresponding to a high-frequency signal input;

a plurality of driver transistors, each being provided between said high-frequency signal transmitting circuit and each of a plurality of sensor coils for transmitting the high-frequency current to the corresponding sensor coil; and a plurality of switches, each being provided with respect to each of said plurality of driver transistors for turning on/off the corresponding driver transistor.

13. The current feed circuit for sensor coils in a coordinate input device of claim 12, wherein each of said plurality of driver transistors is cascade-connected to the output of the high-frequency signal transmitting circuit.

14. The current feed circuit of claim 12, wherein said high-frequency signal transmitting circuit comprises a high-frequency signal generator and a separation circuit.

15. The current feed circuit of claim 12, wherein said high-frequency signal transmitting circuit includes a three-transistor current-mirror circuit.

16. The current feed circuit of claim 12, wherein said plurality of driver transistors are connected in parallel with each other.

17. The current feed circuit of claim 12, wherein said high-frequency current is generated using two power supplies.

18. The current feed circuit of claim 12, wherein said high-frequency current is generated using one power supply.

19. The current feed circuit of claim 12, wherein said driver transistors are selected from the group consisting of bipolar transistors and field effect transistors.

20. A current feed circuit method for feeding a high-frequency current to a plurality of sensor coils included in an electromagnetic inductive coordinate input device, comprising the steps of:

generating a first high-frequency current corresponding to a positive half-wave high-frequency signal input;

generating a second high-frequency current corresponding to a negative half-wave high-frequency signal input;

combining the first high-frequency current with the second high-frequency current;

transmitting the combined current to a corresponding one of a plurality of sensor coils;

providing a first high-frequency signal transmitting circuit for generating the first high-frequency current;

providing a second high frequency signal transmitting circuit for generating the second high-frequency current; and connecting a first plurality of driver transistors between the first high-frequency signal transmitting circuit and each of the plurality of sensor coils.

21. The method of claim 20, comprising the step of connecting a second plurality of driver transistors between second high-frequency signal transmitting circuit and each of the plurality of sensor coils.

22. The method of claim 21, including the step of providing a first plurality of switches, each one of the first plurality of switches for turning on/off one of the first plurality of driver transistors.

23. The method of claim 22, including the step of providing a second plurality of switches, each one of the second plurality of switches for turning on/off one of the second plurality of driver transistors.

24. The method of claim 23, including the step of providing a circuit element for combining the first high-frequency current with the second high-frequency current.

* * * * *